(12) United States Patent
Fischer et al.

(10) Patent No.: US 7,465,888 B2
(45) Date of Patent: Dec. 16, 2008

(54) CAST-IN ELEMENT FOR FORMING A LEADTHROUGH FOR CONDUITS

(75) Inventors: Marco Fischer, Augsburg (DE); Thomas Monden, Stetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/588,124

(22) Filed: Oct. 25, 2006

(65) Prior Publication Data

US 2007/0099509 A1    May 3, 2007

(30) Foreign Application Priority Data

Oct. 27, 2005    (DE) .................. 10 2005 000 146

(51) Int. Cl.
*H02G 3/18* (2006.01)

(52) U.S. Cl. .................. 174/655; 174/653; 174/50.54; 174/135; 439/583; 248/56; 361/809

(58) Field of Classification Search ......... 174/653–660, 174/135, 68.1, 68.3, 50.54, 50.56; 439/583, 439/594, 462, 581, 584, 610; 361/809; 248/56; 285/341, 64, 211, 903; 52/220.8, 220.1, 52/232, 577

See application file for complete search history.

(56) References Cited

U.S. PATENT DOCUMENTS

| | | | |
|---|---|---|---|
| 3,027,416 A * | 3/1962 | Kissel .................. | 174/57 |
| 5,798,910 A * | 8/1998 | Holbeche et al. ......... | 361/809 |
| 6,694,684 B2 * | 2/2004 | Radke et al. ............ | 52/232 |
| 7,002,077 B2 * | 2/2006 | Pyron ................... | 174/652 |
| 2004/0016190 A1 | 1/2004 | Radke et al. | |

* cited by examiner

*Primary Examiner*—Dhiru R Patel
(74) *Attorney, Agent, or Firm*—Abelman, Frayne & Schwab

(57) ABSTRACT

A cast-in element for forming a leadthrough for conduits includes a jacket tube (12; 42, 43; 62) having a thread-shaped outer profile (13; 44, 45; 63), and a base member (14; 51) with a receiving space (16) for receiving stop elements (17; 52) with an end of the base member (14; 51) forming and surrounding a through-opening (15) and having, in a region of the through-opening (15), a thread-shaped inner profile (18) corresponding to the thread-shaped outer profile (13; 44, 45; 63) of the jacket tube (12; 42, 43; 62).

6 Claims, 4 Drawing Sheets

CAST-IN ELEMENT FOR FORMING A LEADTHROUGH FOR CONDUITS

BACKGROUND OF THE INVENTION

1. Field of the Invention

The present invention relates to a cast-in element for forming a leadthrough for conduits and including a jacket tube and a base member having a space for receiving stop means and surrounding a through-opening of the cast-in element.

2. Description of the Prior Art

When planning and constructing buildings, on many occasions, leadthroughs for conduits, tubes, cables and the like are formed in walls and ceilings and only during a later constructional phase, e.g., during upgrade of the project, conduits are passed therethrough. In this way, damage of the tubes, cables or the like during earlier constructional phases is prevented. In order, e.g., to form a leadthrough in a ceiling, already during preparing a formwork, a tubular device with a desired diameter is secured on the formwork as a place-holder and, afterwards, remains cast in the cast constructional component such as concrete ceiling or concrete wall. The place-holder, thus, remains in the cast constructional component and projects past the cast constructional component at least on one side. The empty leadthroughs present a danger in case of fire as they can contribute to propagation of fire. Therefore, measure should be undertaken which would insure that the propagation of fire through the leadthrough is prevented at least for a predetermined minimal time period. To this end, the tubular devices contain in a space that surrounds the through-opening, e.g., a fire stopping mass that expands in case of fire and closes the leadthrough upon its expansion. With a flammable plastic tube, the intumescent mass prevents propagation of fire through the tube, while the tube crushes upon the expansion of the intumescent mass and closes the leadthrough. Such cast-in elements are formed of a one-piece housing, e.g., of plastic material and which, e.g., is cut to a length corresponding to the thickness of the to-be-produced constructional component.

A drawback of the known solution consists in that at large thicknesses of the constructional component, the required length of the cast-in element exceeds the length of conventionally produced cast-in elements. The user compensates these differences, e.g., with auxiliary elements which, however, often become unstable upon casting of the constructional component and/or which are associated with increased costs, in particular, connected with their proper attachment. From the economic point of view, manufacturing of a cast-in element that would cover at least the largest portion of the thickness of the constructional component, does not make sense because in many cases, a large section of a cast-in element would have to be cut off. In addition, with these cast-in elements, the cover for closing the through-opening can be mounted on the free end of the cast-in element during casting of the constructional component only using a form-locking connection. The cover must be secured on the cast-in element using additional means.

U.S. Publication US 2004/0016190 A1 discloses a cast-in element for forming a leadthrough for conduits and which includes a jacket tube and a base member connectable with the jacket tube. The base member has a receiving space for firestop means. The firestop means is an intumescent mass that expands in case of fire and closes the through-opening. The jacket tube is formed of a plurality of transverse bands connected by releasable connection means and held together by a holding section. A cover or a coupling is attached to the free end of the jacket tube with snap connection means.

The drawback of the cast-in element of the above-referenced publication consists in that the jacket tube can be brought to a desired length only in steps. Further, the manufacturing of the known cast-in element is expensive, which is a big drawback in mass production which the cast-in element represent.

Accordingly, an object of the present invention is a cast-in element for leadthroughs for conduits and which can be steplessly cut to a desired length and is modular in use.

SUMMARY OF THE INVENTION

This and other objects of the present invention, which will become apparent hereinafter, are achieved by providing a cast-in element having a jacket tube provided with a thread-shaped outer profile and a base member having a space for receiving stop means and surrounding a through-opening and having, in a region of the through-opening, a thread-shaped inner profile corresponding to the thread-shaped outer-profile of the jacket tube.

The inventive cast-in element is formed as a modular element. For stopping fire, an intumescent mass that forms the stop means is located in the receiving space. For sealing against liquids, mass that swells upon a contact with a liquid, can be used as stop means receivable in the receiving space.

The jacket tube can be steplessly cut to a desired length and can be reliably connected with the base member with the thread-shaped connection providing a connection point of contact. The jacket tube is made available to the user as an elongate tube having a thread-shaped outer profile over its entire longitudinal extent, and which the user cuts to a necessary length for the jacket tube of the cast-in element. The thread-shaped outer profile of the jacket tube and/or the thread-shaped inner profile of the base member are advantageously so formed that they can be connected with each other by being screwed together, without treatment of the cut edge of the jacket tube.

The thread-shaped form of the outer profile of the jacket tube and/or the thread-shaped form of the inner profile of the base member can have, in different embodiments, a different thread geometry or a steplessly formed geometry with regard to pitch, thread height, or can be of a multi-lead thread form. According to an advantageous embodiment of the present invention, the thread-shaped inner profile is formed of sequential thread pitch sections.

The thread-shaped outer profile of the jacket tube provides such a connection with the cast component that no hair cracks and capillars, which lead to loss of tightness, are formed.

Advantageously, the thread-shaped outer profile of the jacket tube is connected with a cover that has, at least region-wise, a thread-shaped inner profile corresponding to the thread-shaped outer profile. As a result, the cover can be reliably screwed on the jacket tube. The cover is forcelockingly retained on the jacket tube and need not be secured thereon with use of additional means. In an advantageous embodiment of the present invention, the thread-shaped outer profile of the jacket tube is connectable with projections provided on the cover. The projections are provided on the side of the cover that abuts the jacket tube, and have a thread-shaped inner profile corresponding to the thread-shaped outer profile of the jacket tube. Advantageously, the cover is additionally secured on the free end of the jacket tube by form-locking connection means.

Advantageously, the cover is additionally provided with sealing lips which in the assembled condition of the cover, e.g., engage the inner wall of the jacket tube.

Advantageously, the thread-shaped outer profile of the jacket tube is connectable with a second base member having a space for receiving stop means and surrounding the through-opening and having, in a region of the through-opening, a thread-shaped inner profile corresponding to the thread-shaped outer profile of the jacket tube. The second base member contains, in its receiving means, the stop means, e.g., in form of an intumescent mass or a mass that swells upon contact with the liquid.

Such cast-in element has, e.g., the base member at each of opposite ends of the jacket tube for fireclosing the leadthrough. Such cast-in element is used with wall leadthroughs when fire can occur on both sides of the wall. In an alternative embodiment, the cast-in element has, at opposite ends of the jacket tube, a base member for closing the leadthrough against penetration of liquid. Further, a base member for fireproofing the leadthrough can be provided at one end of the jacket tube, and another base member for liquid-proofing of the leadthrough can be provided at the opposite end of the jacket tube.

When the thread-shaped outer profile of the jacket tube is formed of two sections they can be connected with a sleeve-shaped connection member. This can be the case when the jacket tube is inadvertently cut shorter than needed or when a cut-off piece of the jacket tube is used. In this case, the sleeve-shaped connection member, which is provided on the free end of the base jacket tube, forms a connection point for a further jacket tube or a cut-off piece.

According to a further advantageous embodiment of the present invention, the sleeve-shaped connection member has a thread-shaped inner profile corresponding to the thread-shaped outer profile of the jacket tube. This insures a reliable connection of, e.g., two jacket tubes which can be easily assembled and which remain stable during casting of the constructional component. In addition, such a connection is liquidtight, which prevents penetration of the casting mass for the constructional component in the through-opening of the cast-in element.

The jacket tube, the base member, the cover, and the connection member of the inventive cast-in element are advantageously formed of a plastic material. Alternatively, some or all of the components of the cast-in element can be formed of metal and, if necessary, combined with components of the cast-in element made of a plastic material.

The inventive cast-in element is characterized by easy handling and by its modularity. The separate components of the cast-in element are connectable with each other in different ways, so that with this cast-in component, almost all possible different types of leadthroughs can be economically produced without large expenses.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
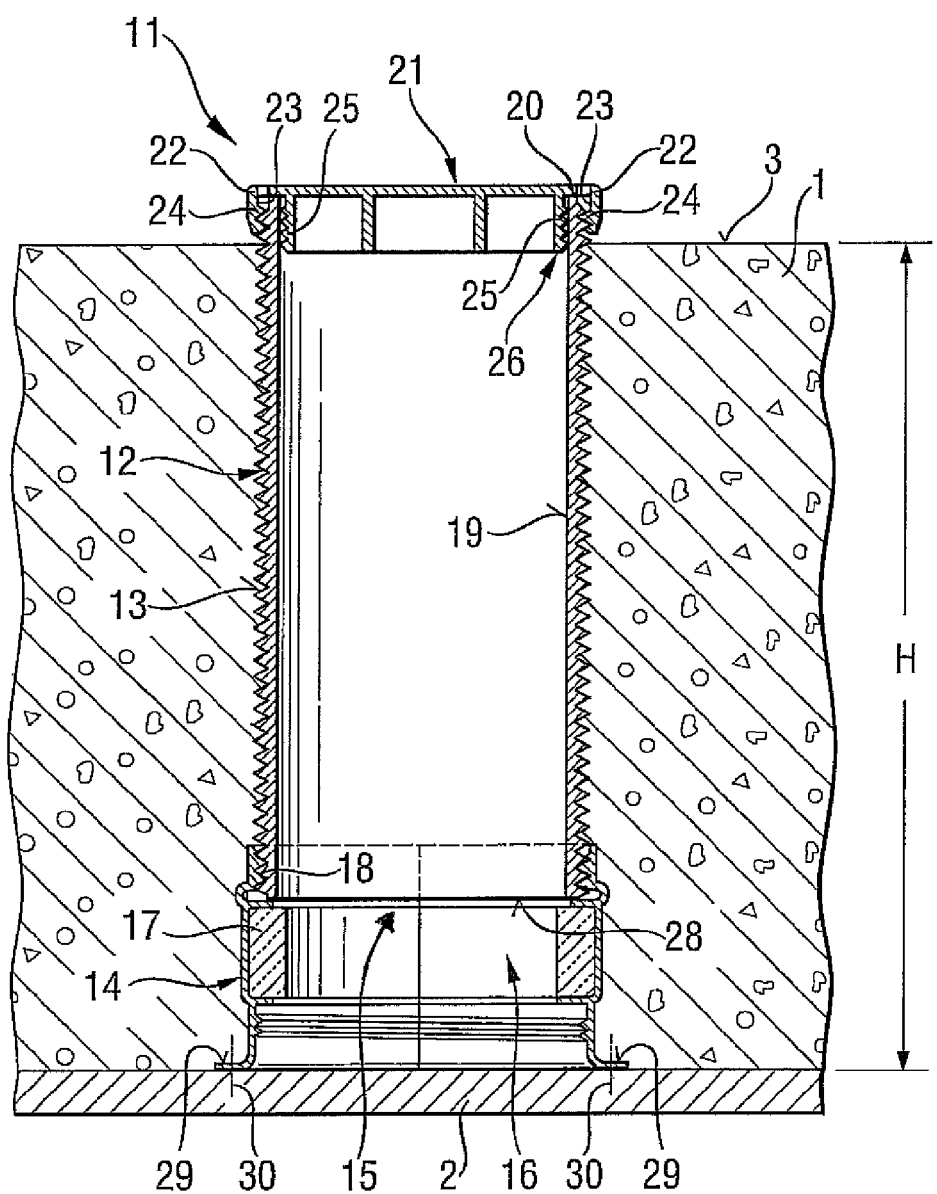
FIG. 1 a cross-sectional view along line I-I in FIG. 2 of a first embodiment of a cast-in element according to the present invention.
Figure 2:
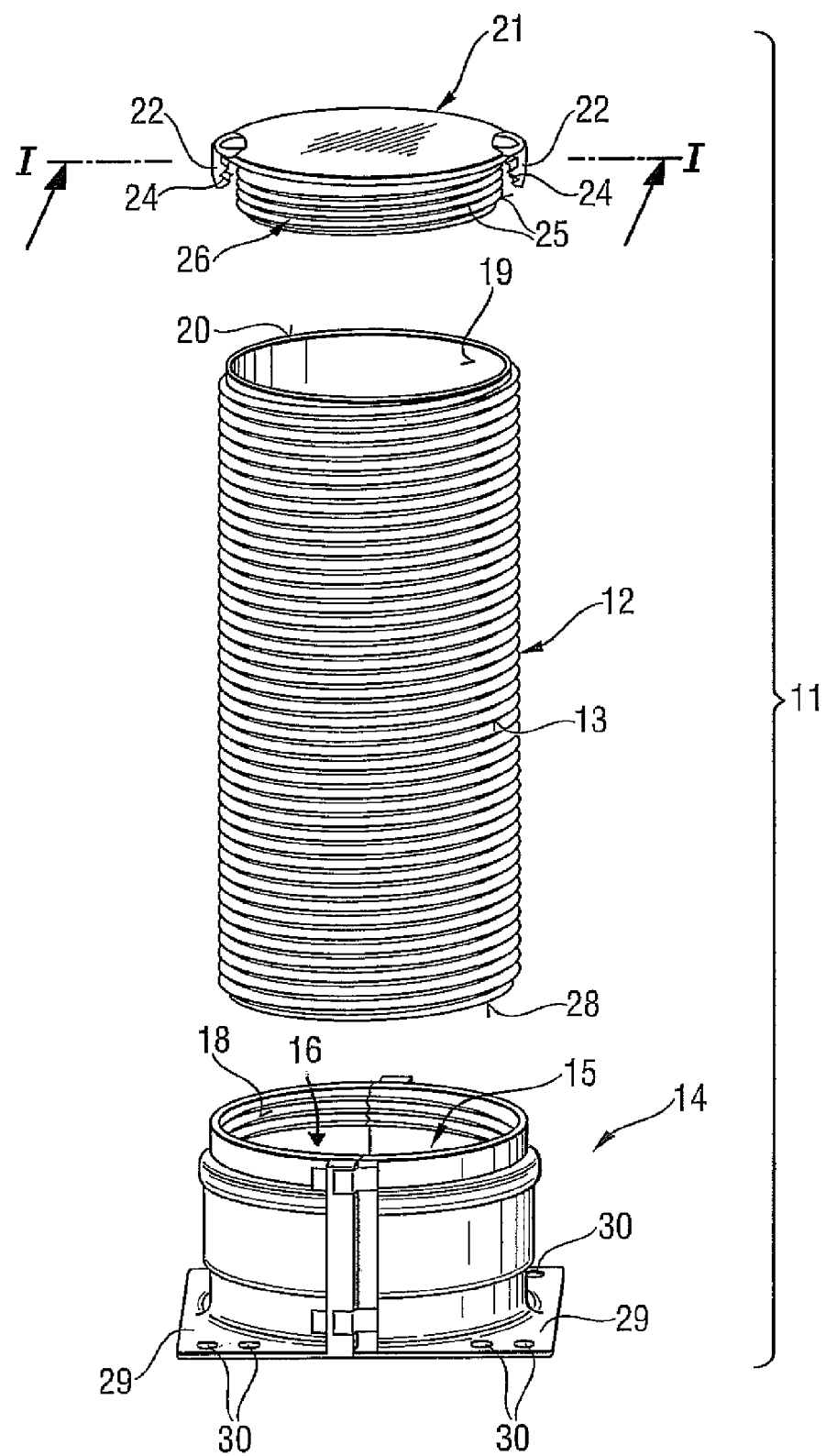
FIG. 2 a perspective exploded view of the cast-in element shown in FIG. 1.

A cast-in element 11 according to the present invention, which is shown in FIGS. 1-2, includes a jacket tube 12 with a thread-shaped profile 13 that is formed as a continuous thread extending over the entire longitudinal extent of the jacket tube 12.

The cast-in element 11 further includes a base member 14 having a receiving space 16 for receiving stop means 17. The base member 14 provides, at one open end thereof and adjoining the receiving space 16, a through-opening 15 of the cast-in element 11 with the open end of the base member 14 surrounding and forming the through-opening 15. In the region of the through-opening 15 and adjoining the receiving space 16, there is provided, on the base member 14, an inner profile 18 that corresponds to the thread-shaped profile 13. The cast-in element 11 further includes a cover 21 connectable with the thread-shaped profile 13 by projections 22 which are formed on the cover 21. On sides 23 of the projections 22 which adjoin the thread-shaped profile 13 of the jacket tube 12, there are provided, respectively, thread sections 24 which form a thread-shaped inner profile corresponding to the outer profile 13 of the jacket tube 12.

The cover 21 further includes an insertion section 26 that projects from the cover 21 and is provided with sealing lips 25 or its circumference. In the assembled condition of the cast-in element 11, the sealing lips 25 engage the inner wall 19 of the jacket tube 12, so that the free end 20 of the jacket tube 12 is reliably sealed.

The use of the inventive cast-in element 11 will be explained below with reference to FIG. 1. In the first step, the jacket tube 12 is cut to a desired length corresponding to the height H of the constructional component 1, and is connected with the base member 14 by being screwed thereinto. The length of the jacket tube 12 is so selected that in its cast-in condition, it projects somewhat above the surface 3 of the constructional component 1. The thread-shaped outer profile 13 of the jacket tube 12 and the corresponding inner profile 18 of the base member 14 are so formed that they can be connected with each other without further treatment of the edge 28 of the cut.

The base member 14 has flange sections 29 with a plurality of nail holes 30. The assembled cast-in element 11 is positioned in a desired location in the formwork 2 and is secured thereto with nails extending through the nail holes 30. Then, the cover 21 is screwed onto the free end 20 of the jacket tube 12. Finally, the constructional component 1 is cast, with the thread-shaped outer profile 13 of the jacket tube 12 providing a formlocking connection between the cast-in element 11 and the constructional component 1. The formlocking connection prevents formation of hair cracks and capillars.

Figure 3:
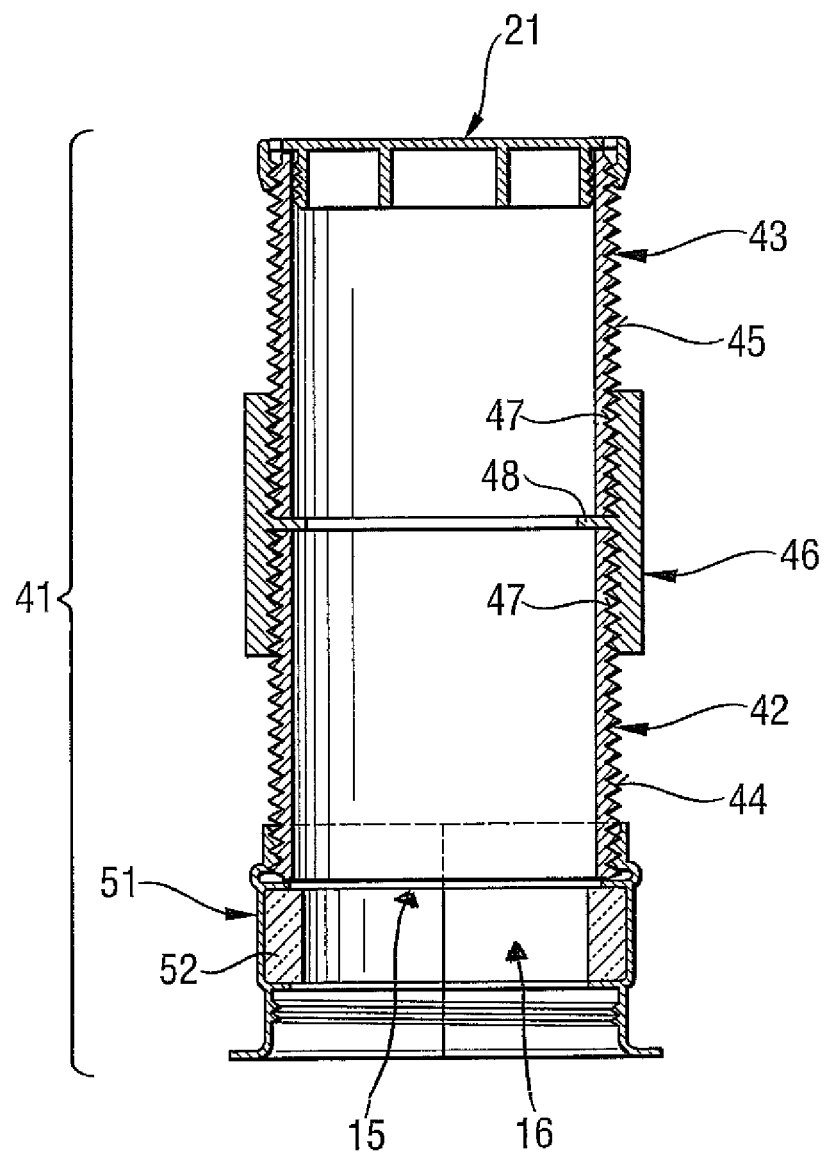
FIG. 3 a cross-sectional view of a second embodiment of a cast-in element according to the present invention.

The cast-in element 41, which is shown in FIG. 3, includes a first jacket tube 42 and a second jacket tube 43 having respective thread-shaped profiles 44 and 45. The first jacket tube 42 and the second jacket tube 43 are connected by a sleeve-shaped connection member 46 that has an inner profile 47 corresponding to thread-shaped outer profiles 44 and 45. The sleeve-shaped connection member 46 further has a circumferential inner projection 48 that acts as a stop for the jacket tubes 42 and 43 which are connected by the connection member 46. The cast-in element 41 further includes a cover 21 and a base member 51 that contains stop means 52 in form of a mass that swells upon contact with liquid, forming a barrier against liquids.

Figure 4:
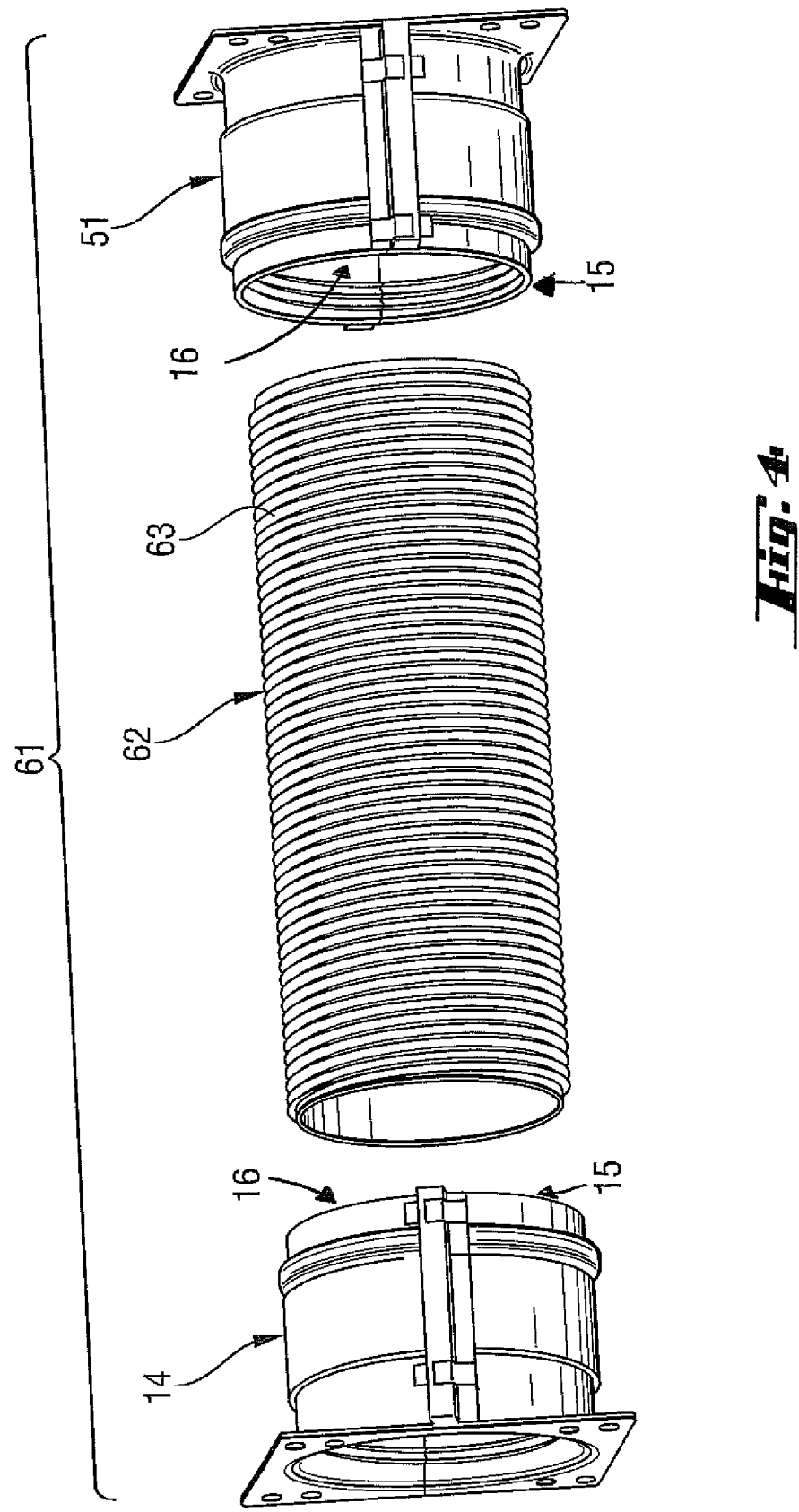
FIG. 4 a perspective exploded view of a third embodiment of a cast-in element according to the present invention.

The cast-in member 61, which is shown in FIG. 4, includes a jacket tube 62 with a thread-shaped outer profile 63, a base member 14 with intumescent mass forming the barrier, and a base member 51 with a material that swells upon contact with liquid. Instead of the base member 51, another base member 14 with intumescent mass as a stop means, can be provided on the jacket tube 61. Alternatively, instead of the base member 14, another base member 51 with a mass that swells upon contact with liquid for forming a barrier, can be provided on the jacket tube 62.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A cast-in element for forming a leadthrough for conduits, comprising a jacket tube (12; 42, 43; 62) having a thread-shaped outer profile (13; 44, 45; 63) extending over the entire longitudinal length of the jacket tube (12; 42, 43; 62); and at least one base member (14; 51) each having at least one receiving space (16) for receiving at least one stop means (17; 52) into the at least one receiving space (16), with each of the stop means (17; 52) surrounding at least one through-opening (15) of the cast-in element (11) and having, in a region of the at least one through-opening (15), a thread-shaped inner profile (18) corresponding to the thread-shaped outer profile (13; 44, 45; 63) of the jacket tube (12; 42, 43; 62).

2. A cast-in element according to claim 1, further comprising:
   a cover (21) having projections (22) including inward threads (24);
   wherein the thread-shaped outer profile (13; 45) of the jacket tube (12; 43) includes outward threads, with the inward threads (24) of the cover (21) being complementary to the outward threads for threading the cover (21) onto an end of the thread-shaped outer profile (13, 45) for connecting the end to the cover (21).

3. A cast-in element according to claim 1, wherein the at least one base member (14; 51) includes: two base members (14; 51) including: a first base member (14); and a second base member (51), with each of the first base member (14) and the second base member (51) being connectable with the jacket tube (62) and each of the first base member (14) and the second base member (51) includes a respective said receiving space (16) for receiving each of the respective stop means (17; 52) and surrounding each of the respective through-opening (15) and having, in a region of each of the respective through-opening (15), a thread-shaped inner profile (18) corresponding to the thread-shaped outer profile (13; 44, 45; 63) of the jacket tube (12; 42, 43; 62).

4. A cast-in element according to claim 1, wherein the thread-shaped outer profile of the jacket tube (42, 43) is formed of two sections (44, 45) connectable with a sleeve-shaped connection member (46).

5. A cast-in element according to claim 4, wherein the sleeve-shaped connection member (46) has a thread-shaped inner profile (47) corresponding to the thread-shaped-outer profile (44, 45) of the jacket tube (42, 43).

6. A cast-in element for forming a leadthrough for conduits, comprising:
   a jacket tube (12; 42, 43; 62) having:
      a thread-shaped outer profile (13; 44, 45; 63); and
      a base member (14; 51) having a space (16) for receiving stop means (17; 52) and surrounding a through-opening (15) of the cast-in element (11) and having, in a region of the through-opening (15), a thread-shaped inner profile (18) corresponding to the thread-shaped outer profile (13; 44, 45; 63) of the jacket tube (12; 42, 43; 62); and
   a cover (21) having projections (22) including inward threads (24);
   wherein the thread-shaped outer profile (13; 45) of the jacket tube (12; 43) includes outward threads, with the inward threads (24) of the cover (21) being complementary to the outward threads for threading the cover (21) onto an end of the thread-shaped outer profile (13, 45) for connecting the end to the cover (21); and
   wherein the thread-shaped outer profile (13; 45) of the jacket tube (12; 43) is connectable with the projections (22) provided on the cover (21).

* * * * *